March 3, 1970  C. P. RONDEN  3,497,915
EXTRUSION DIE

Filed March 16, 1967  4 Sheets-Sheet 1

INVENTOR.
CLIFFORD P. RONDEN
BY Arnold, Roylance,
Kruger and Durkee
ATTORNEYS

March 3, 1970

C. P. RONDEN 3,497,915

EXTRUSION DIE

Filed March 16, 1967

INVENTOR.
CLIFFORD P. RONDEN
BY Arnold, Roylance,
Kruger and Durkee
ATTORNEYS

United States Patent Office 3,497,915
Patented Mar. 3, 1970

3,497,915
EXTRUSION DIE
Clifford P. Ronden, Edmonton, Alberta, Canada, assignor to Cupples Container Company, Austin, Tex., a corporation of Missouri
Filed Mar. 16, 1967, Ser. No. 623,643
Int. Cl. B29d 23/04
U.S. Cl. 18—14                               3 Claims

ABSTRACT OF THE DISCLOSURE

An extrusion die for extruding thermoplastic material, wherein the different structural parts which define the flow channel leading to the die orifice are maintained at substantially uniform temperatures. The die includes a die orifice and spaced apart inner and outer body members which cooperate to define a tubular flow channel leading to the die orifice. The inner body structure is connected to the outer body by a plurality of spider arms which extend across the tubular flow channel. Each spider arm has a bore which extends lengthwise thereof and opens into a mating bore in the outer body structure. Heating elements, such as an electrical cartridge, are placed in each bore and operate to heat both the inner body structure and the spider arms. Heating rings are placed around the outer body member.

---

This invention relates to extrusion dies for polymeric thermoplastic materials and, more particularly, to dies of the type in which the heat-plastified polymeric material is extruded through an annular orifice. Though applicable to other materials, dies in accordance with the invention are especially advantageous for extruding foamable thermoplastic materials.

In the production of sheet by extrusion of thermoplastic polymeric materials, it has become common practice to extrude the heat-plastified polymeric material continuously through an annular die orifice to form a tubular product which is then inflated to a larger diameter to establish biaxial orientation, slit longitudinally, and converted to a running flat web. Though the art of extruding sheet from thermoplastic polymeric material is already considerably advanced, much difficulty is still encountered in attempting to attain dependable uniformity of thickness of the extruded sheet, coupled with freedom from surface and internal irregularities. These difficulties are encountered in the extrusion of unfoamed materials such as polyethylene, high impact polystyrene, and the like and, particularly, in the extrusion of foamed thermoplastics.

In the case of unfoamed polymeric thermoplastic materials, prior-art workers have usually attempted to overcome such difficulties by controlling the overall heat input to the die and providing means for accurately adjusting the die orifice gap, but such approaches have not been fully satisfactory. And, in the case of foamed polymeric materials, no really satisfactory solution for such problems has as yet been provided.

I have found that the greater difficulties encountered in extrusion of foamed polymeric material uniformly stems largely from the fact that, for foamed materials, the die must be operated at temperatures markedly lower than those employed when extruding unfoamed materials. Thus for extruding foamable polystyrene materials, typical die temperatures are in the range of 105–145° C., while the corresponding temperatures for regular polystyrene are in the range of 180–232° C. The lower die temperatures necessary for proper extrusion of foamable materials appear to promote nonuniform flow of the heat-plastified material and to increase correspondingly the likelihood of nonuniform internal characteristics and surface irregularities in the extruded product. I have discovered that such difficulties involve two factors, among others, one being the configuration of the flow channel which conducts the heat-plastified material to the die orifice, and the other being the control of the temperature of the parts of the die which define the flow channel.

Since the foamable thermoplastic material is extruded at a temperature which is lower in the softening range for the particular material, and therefore considerably farther from the viscous flow temperature, than is true when the unfoamed thermoplastics are extruded, the resistance to flow of the heat-plastified foamable material along the surfaces of the die parts is higher than in the case of an unfoamed plastic at a higher temperature. Accordingly, the presence of any physical obstruction to flow of the plastic material through the die, and the existence of any substantial temperature differential of the solid surfaces of the die which define the flow channel, are likely to result in severe irregularities in the product.

A general object of the invention is to devise an annular orifice extrusion die, for extruding thermoplastic polymeric material, and especially the foamed thermoplastics, the die being capable of so minimizing tendencies toward nonuniform flow of the plastic material that the extruded product is free of surface irregularities and has a uniform thickness and internal structure.

Another object is to provide such a die in which the parts defining the flow channel which conducts the heat-plastified material to the die orifice are maintained at substantially uniform temperatures.

Broadly stated, dies in accordance with the invention have a streamline tubular flow channel leading forwardly to an annular extrusion orifice, the flow channel being defined by an outer body structure and a cooperating inner body structure which is connected to the outer structure by a plurality of spider arms which extend across the tubular flow channel. Typically, the flow channel commences, at a point upstream from the spider arms, as a cylindrical bore which opens forwardly into an outwardly flaring tubular passage portion which may lead directly to the orifice, in the case of a die with a large diameter orifice, or may open into a forwardly and inwardly tapering passage portion communicating with the orifice, in the case of a die with a smaller orifice. The spider arms extend across the outwardly flaring passage portion, and that portion is of progressively decreasing width so that the cross-sectional area thereof remains constant despite the progressively increasing diameter. The die structure is heated by the combination of primary heaters, advantageously outer heating bands spaced along the length of the die structure, and a secondary heater or heaters arranged to heat not only the outer body structure of the die but also the inner structure. In superior embodiments, only two spider arms are employed, and these are aligned diametrically across the tubular flow passage, a single transverse bore being provided which extends through the two spider arms and the portion of the inner body structure between the spider arms, and a heating element such as a conventional cartridge type electrical resistance heater is disposed in the transverse bore and operates to heat both the inner body structure and the two spider arms.

In order that the manner in which the foregoing and other objects are achieved in accordance with the invention can be understood in detail, a particularly advantageous embodiment thereof will be described with reference to the accompanying drawings, which form a part of this specification, and wherein.

Figure 1:
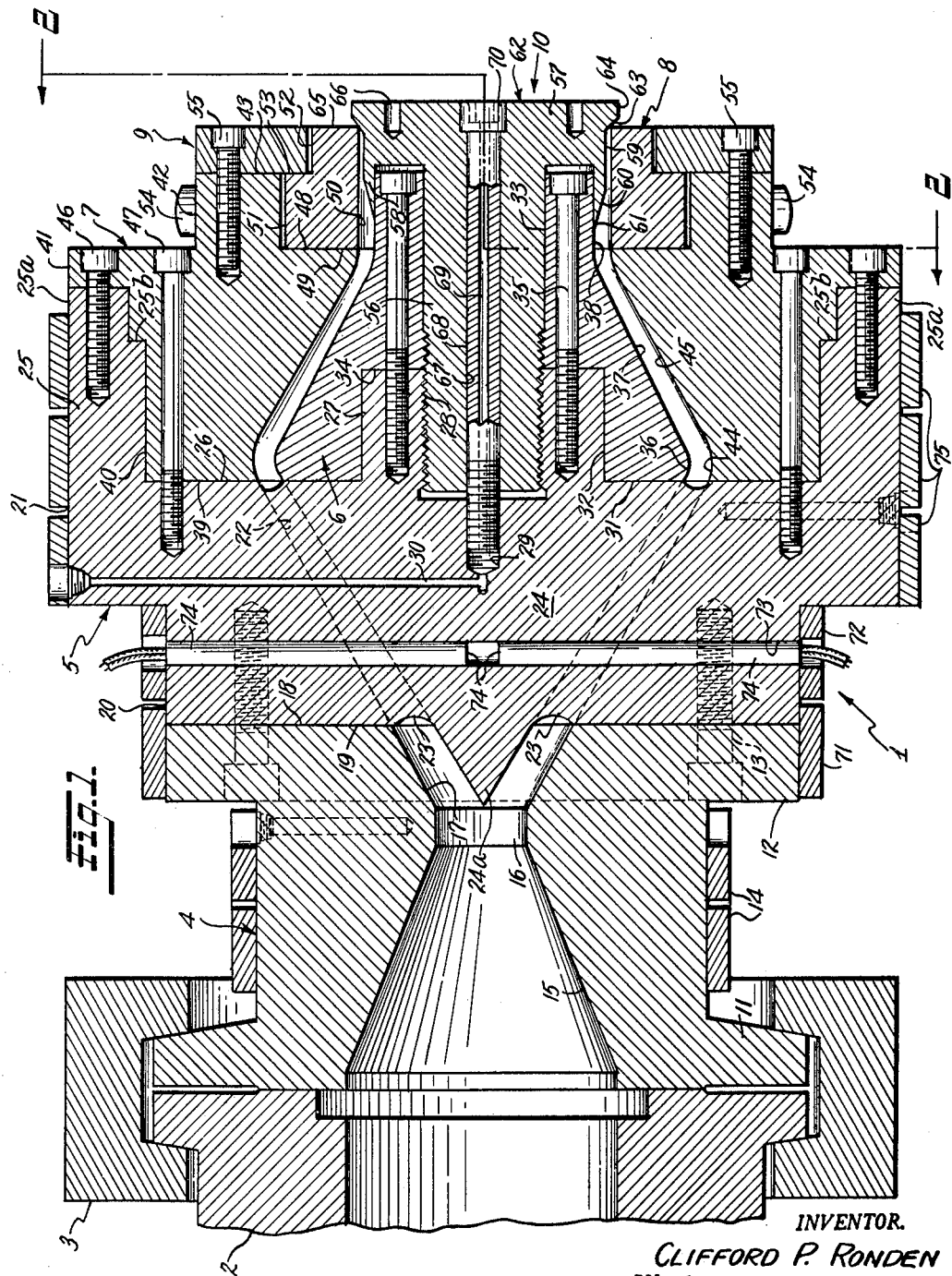
FIG. 1 is a longitudinal sectional view of the die assembled for smaller diameter extrusion.
Figure 2:
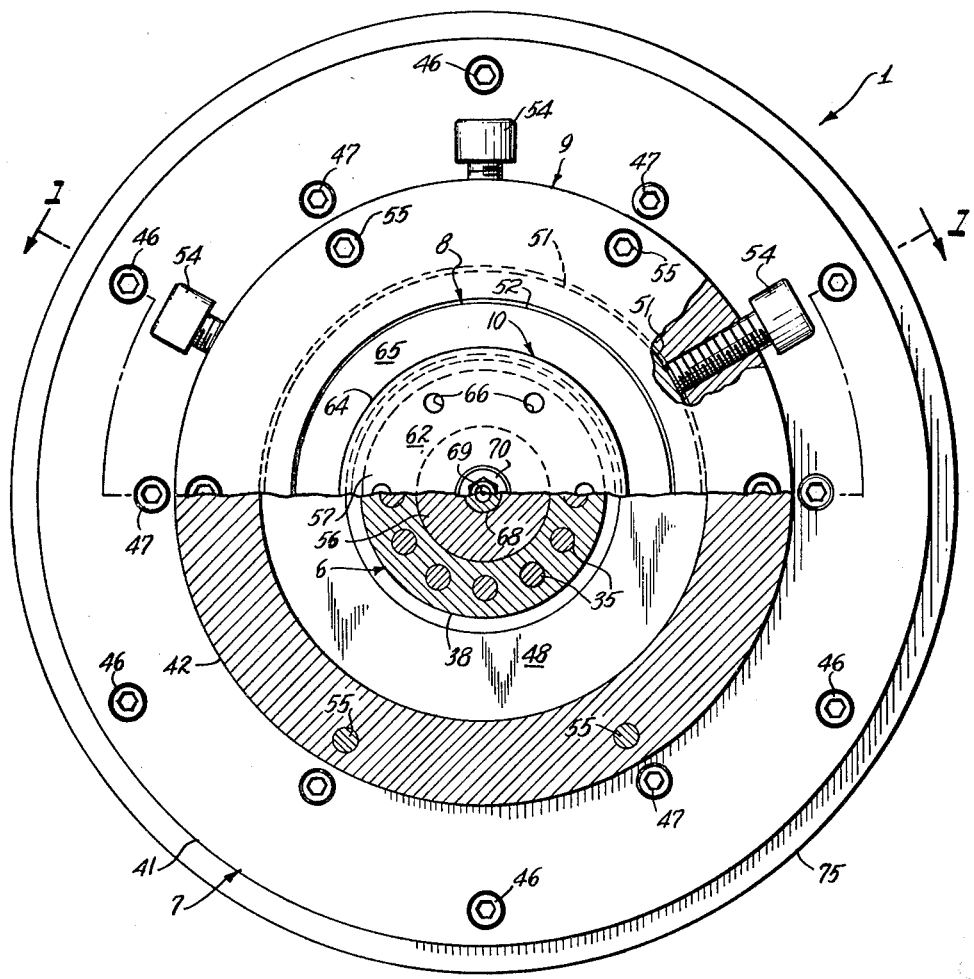
FIG. 2 is a view, partly in front end elevation and partly in transverse cross section, taken generally on line 2—2, FIG. 1.

Referring now to the drawings in detail, and first to FIGS. 1 and 2, the embodiment of the invention here illustrated comprises a die structure indicated generally at 1 and secured to the body 2 of a conventional extruder by means of a ring clamp 3. The die structure includes a rear die body member 4, a main torpedo body 5, an interchangeable torpedo body 6, an internal fixed die ring 7, a floating die ring 8, an external fixed die ring 9 and a mandrel 10.

Rear die body member 4 is cylindrical and includes a circular rear flange 11, secured against the front flange of the extruder body by the clamp 3, and a circular front flange 12 secured to the flat rear face of main torpedo body 5 by screws 13. Between flanges 11 and 12, body member 4 has a right cylindrical outer surface on which conventional cylindrical electrical resistance heater bands 14 are disposed. The bore of body member 4 includes a frusto-conical rear portion 15 which tapers forwardly and inwardly to join a short cylindrical portion 16, the bore being completed by a relatively short frusto-conical front portion 17 which tapers from portion 16 forwardly and outwardly to open through the front face 18 of the body member.

Main torpedo body 5 has a flat rear face 19, lying in flush engagement with face 18, a rear cylindrical outer surface portion 20 of the same diameter as flange 12, and a front outer surface portion 21 of substantially larger diameter. Internally, body 5 has a frusto-conical wall 22 which tapers forwardly and outwardly as a continuation of the wall of the frusto-conical bore portion 17 of member 4 and is interrupted by a single pair of diametrically aligned webs or spider arms 23 which support the rearwardly tapering conical torpedo portion 24. At its front end, body 5 has an outer, forwardly projecting tubular poriton 25, a flat transverse annular face 26, and a cylindrical forwardly projecting central boss 27 which is concentric with portion 25 and is provided with a forwardly opening threaded central bore 28. Bore 28 stops just behind face 26, and a smaller diameter threaded bore 29 extends axially therefrom to intersect a radial duct 30 provided at its outer end with a threaded socket to accommodate a connector (not shown) for the usual compressed air line. Portion 25 is cylindrical and includes a front end portion 25a of enlarged internal diameter, compared to the remainder of portion 25, there being a forwardly facing transverse annular shoulder at 25b.

Wall 22 and the conical outer surface of torpedo portion 24 cooperate to form a generally frusto-conical flow passage which communicates directly with the front bore portion 17 of body member 4 and opens forwardly through face 26. The tip 24a of torpedo portion 24 projects rearwardly from body 5 through bore portion 17 of member 4 so that the conical surface of portion 24 also cooperates with the wall of bore portion 17 to define a continuation of the frusto-conical passage just mentioned. The tubular flow passage defined by the outer surface of torpedo portion 24 and the surrounding wall of bore portion 17 and wall 22 increases in diameter forwardly. The wall of bore portion 17 and the wall 22 can be considered as a single continuous frusto-conical surface and it will be noted that this surface converges forwardly toward the outer surface of torpedo portion 24. The arrangement is such that the transverse cross-sectional area of the flow passage at surface 26 is equal to the transverse cross-sectional area of cylindrical bore portion 16.

The interchangeable torpedo body 6 has a flat transverse annular rear face 31, a cylindrical rear bore portion 32 of a diameter such as to snugly embrace the central boss 27 of body 5, and a cylindrical front bore portion 33 of a diameter substantially equal to that of bore 28 in boss 27, bore portions 32 and 33 being joined by a transverse annular rearwardly facing shoulder 34. Body 6 is removably secured to body 5, as by screws 35, with rear face 31 and shoulder 34 in respective engagement with face 26 and the front end of boss 27. At the rear end of body 6, the outer surface portion 36 thereof tapers forwardly and outwardly as a continuation of the surface of torpedo portion 21 of body 5, and then curves smoothly to join a forwardly and inwardly tapering frusto-conical intermediate surface portion 37. At it front end, surface portion 37 curves smoothly to join a right cylindrical front surface portion 38 which is concentric with the longitudinal axis of body 5.

The internal fixed ring 7 has a flat transverse annular rear face 39, a rear cylindrical outer surface portion 40 of a diameter such as to be snugly embraced by tubular portion 25 of body 5, a transverse annular outwardly projecting flange 41 of the same outer diameter as is portion 25, and a forwardly projecting tubular cylindrical portion 42 which is concentric with and of a smaller diameter than flange 41 and which has a flat transverse annular front face 43. Internally, ring 7 has a central bore defined by wall portions 44 and 45 which are of larger diameter than the outer surface portions 36 and 37, respectively, of body 6. Surface 45 tapers forwardly and inwardly somewhat more shaply than does surface 37, so that the flow passage portion defined by these two surfaces decreases progressively in transverse cross-sectional area at a more rapid rate than would result solely by the decreasing diameter.

Ring 7 is secured to body 5 by screws 46 and 47 with th rear face 39 of the ring engaging the front face 26 of body 5, with outer surface portion 40 embraced snugly by portion 25 of body 5, and with the rear face of flange 41 engaging the front end face of portion 25. The central bore of ring 7 is axially shorter than body 6 so that, when body 6 and ring 7 are both properly secured to body 5, the front face 48 of the ring, inwardly of portion 42, lies in a transverse plane intersecting cylindrical outer surface portion 38 of body 6 immediately adjacent the juncture between that surface portion and surface portion 37.

Floating die ring 8 has a flat transverse rear face 49, a right cylindrical inner surface 50 of the same diameter as the front end of wall portion 45 of ring 7, and cylindrical outer surface portions 51 and 52, the front surface portion 52 being of smaller diameter than portion 51 and the two surface portions being joined by a flat transverse annular forwardly facing shoulder 53. The axial distance between face 49 and shoulder 53 is substantially equal to the axial distance between faces 48 and 43. The diameter of rear outer surface portion 51 is slightly smaller than the inner diameter of tubular portion 42 of ring 7 so that, when ring 8 is inserted into portion 42 with rear face 49 engaging front face 43, the lateral position of ring 8 relative to ring 7 can be adjusted. Ring 8 is secured rigidly, by radial screws 54, FIG. 2, with the ring in a position such that its inner surface 50 is concentric with front surface portion 38 of body 6 and forms a continuation of the front end of internal surface portion 45 of ring 7. Screws 54 project inwardly through radial threaded bores in tubular portion 42 of ring 7, the tips of the screws directly engaging outer surface portion 51 of ring 8.

The external fixed ring 9 is of rectangular cross section and has an outer diameter equal to that of portion 42 of ring 7 and an inner diameter slightly larger than the diameter of the outer front surface portion 52 of the floating ring 8. With ring 8 in place, ring 9 is secured rigidly to tubular portion 42 of ring 7 by screws 55, the rear face of ring 9 being in flush engagement with front end face 43 of portion 42 and with shoulder 53. Ring 9 thus serves to clamp ring 8 against face 48 of ring 7 and prevents axial movement of ring 8 relative to the die structure.

Mandrel 10 comprises an elongated cylindrical body portion 56 and a transversely enlarged nose portion 57.

Body portion 56 is of a diameter to be slidably embraced by the wall of bore portion 33 of the interchangeable torpedo body 6, and is threaded at its rear and for operative engagement with threaded bore 28 of body 5. Nose portion 57 has an outer rearwardly projecting cylindrical skirt 58 of an inner diameter such as to slidably embrace the cylindrical outer surface portion 38 at the front end of body 6. The outer surface of nose portion 57 includes an intermediate right cylindrical portion 59 of larger diameter than surface portion 38, and a rearwardly and inwardly tapering frusto-conical portion 60 such that the skirt terminates in substantially a knife edge 61 at surface 38 of body 6. The cylindrical intermediate portion 59 of the outer surface of the mandrel nose terminates short of front face 62, the remainder of the outer surface including an outwardly and forwardly tapering frusto-conical portion 63 and a cylindrical portion 64.

The length of the mandrel is such that, when mandrel body 56 is threaded fully into bore 28, the juncture between inner surface 50 and front face 65 of ring 8 is disposed intermediate the ends of frusto-conical surface portion 63 of the nose of the mandrel, so that the juncture and surface portion 63 define the die orifice. The radial width of this orifice (the die gap) can be adjusted by rotation of the mandrel so that the screw thread engagement at bore 28 will cause the mandrel to move forwardly or rearwardly relative to ring 8, depending upon the direction of rotation.

For this purpose, the front of nose portion 57 is provided with recesses 66 to accept the lugs of any suitable adjusting tool.

Mandrel 10 has a central axial bore 67 which accommodates an elongated screw 68 having an axial through passage 69. The threaded tip of screw 68 is engaged in threaded bore 29 in member 5, and the enlarged head 70 of the screw is accommodated in a central recess at the front end of the mandrel, the head of the screw directly engaging the mandrel to apply an axial force thereto and thus fix the mandrel against rotation after the die gap has been adjusted. Through passage 69 opens into bore 29 and thus communicates with duct 30 for the supply of compressed air forwardly through the center of the mandrel.

A central heating band 71 embraces the outer surface of front flange 12 of body member 4 and overlaps the end of surface portion 20 of body 5. The remainder of surface portion 20 accommodates a circular heating band 72. A straight and continuous transverse bore 73, FIG. 1, extends completely through body 5 along a line through the diametrically aligned spider arms 23 and accommodates a conventional electrical resistance heating cartridge 74, the cartridge substantially filling the bore portion in which it is disposed, as will be clear from FIG. 1. The heating cartridge 74 is thus effective to heat the conical torpedo portion 24 and also the spider arms 23 so that the temperature of the surfaces contacted by the heat-plastified polymeric material can be maintained approximately uniform, particularly throughout the length of torpedo portion 24.

Three additional heating bands 75 embrace outer surface 21 of body 5. The combination of heating bands 14, 71, 72 and 75, spaced along the die structure, can be considered as a primary heating means supplying the major input of heat to the die structure. The heater or heaters disposed in bore 74 can be considered as a secondary heating means for supplying heat more directly to the torpedo portion and spider arms so that, for example, the tendency for there to be a marked temperature differentail between surface 22 and the outer surface of torpedo portion 24 is minimized.

Figure 3:
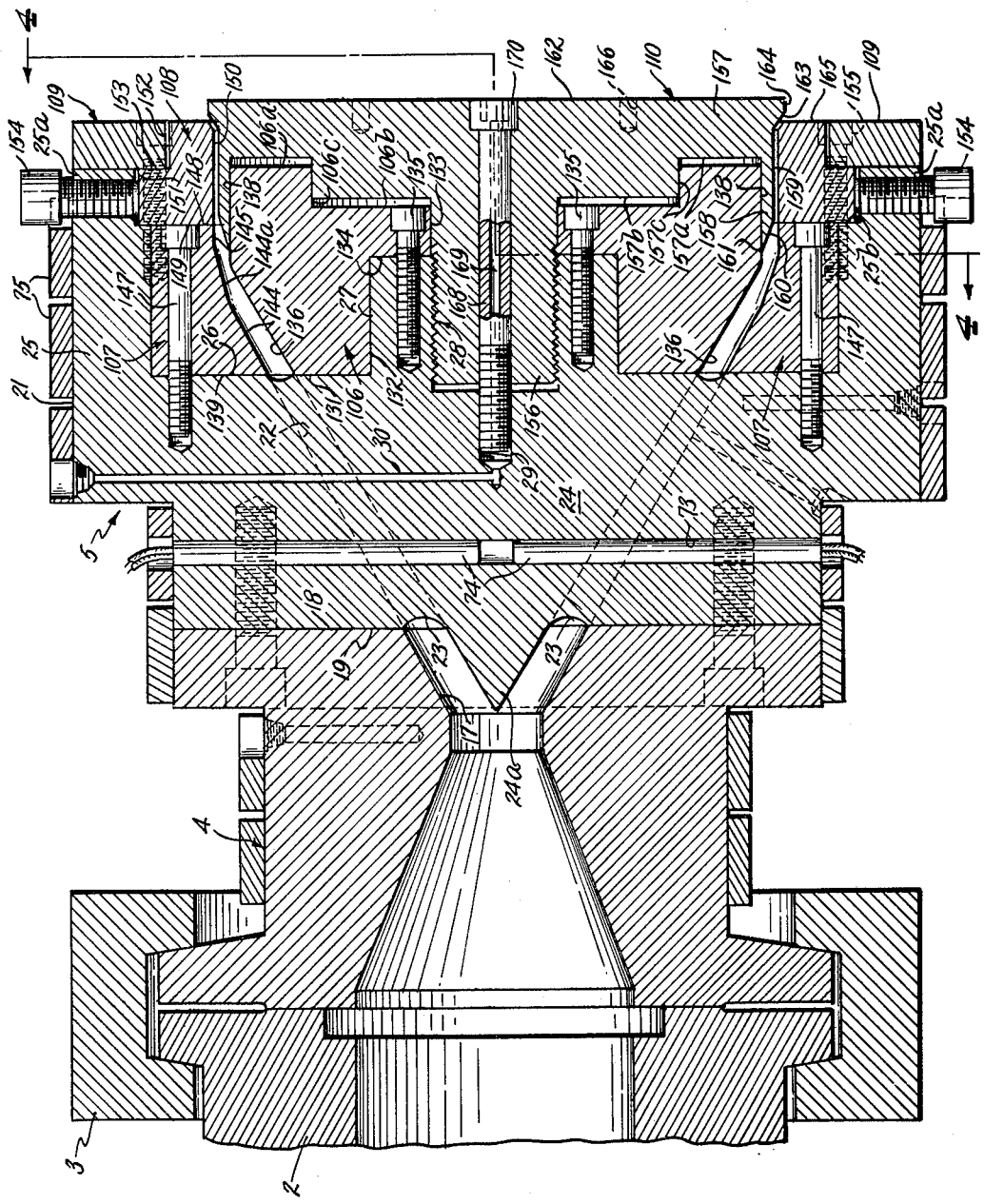
FIG. 3 is a view similar to FIG. 1 but showing the die assembled for larger diameter extrusion.
Figure 4:
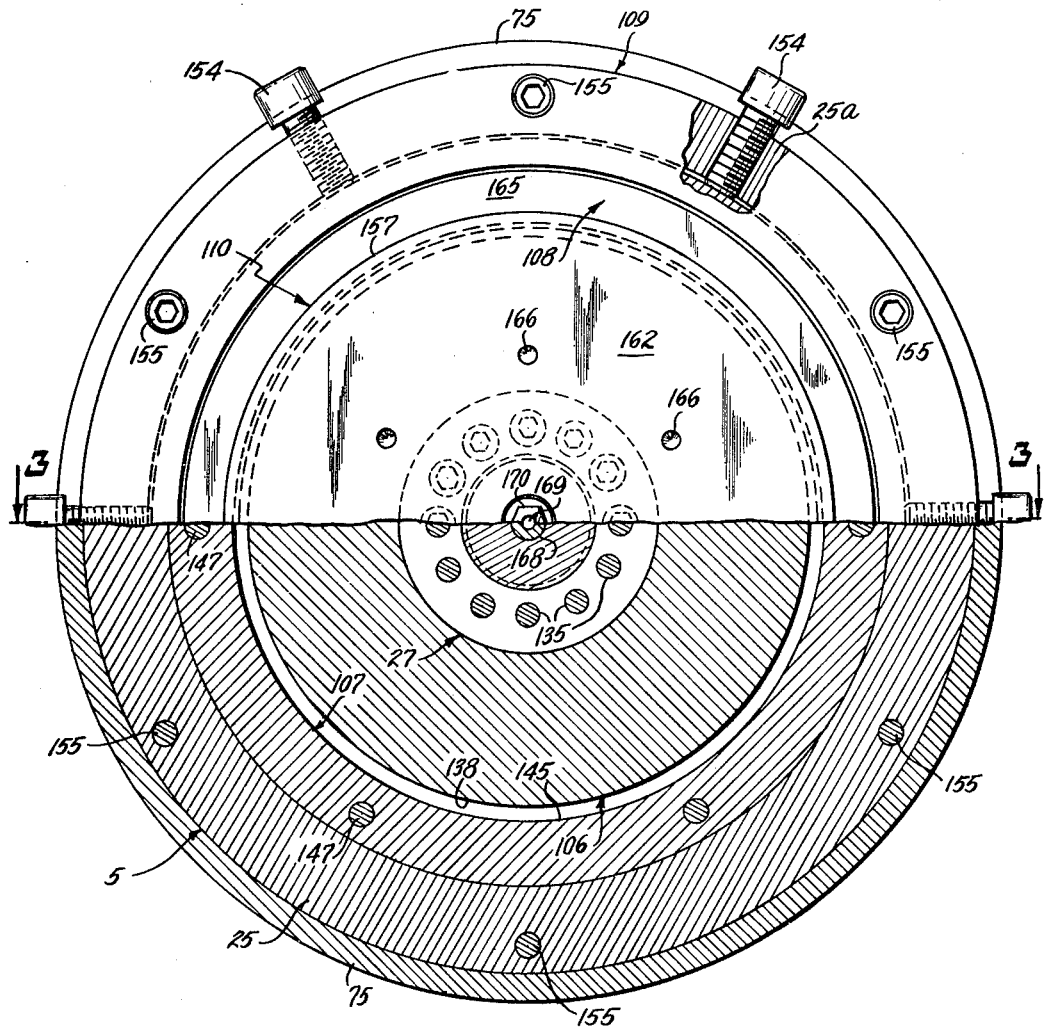
FIG. 4 is a view, partly in front end elevation and partly in transverse cross section, taken on line 4—4, FIG. 3.

Turning now to FIG. 3, it will be noted that the front one of heating bands 75 is notched to provide a clearance for a plurality of threaded bores extending radially through the front end portion 25a of tubular projection 25 of body 5 to accommodate radial screws 154.

Comparing FIGS. 1 and 3, it will be seen that rear body member 4 and main torpedo body 5 are the same elements in each figure. However, in order to provide the larger diameter die orifice of FIG. 3, the interchangeable torpedo body 6, internal fixed ring 7, floating die rings 8, external fixed ring 9, and mandrel 10, all used to provide the smaller die orifice of FIG. 1, are respectively replace by equivalent elements 106–110.

The interchangeably torpedo body 106 has a flat transverse annular rear face 131, a cylindrical centrally disposed rear bore portion 132 of a diameter to snugly embrace boss 27 of body 5, and a cylindrical front bore portion 133 substantially equal in diameter to bore 28 of boss 27, bore portions 132 and 133 being joined by a transverse annular rearwardly facing should 134 engageable with the end face of boss 27. Body 106 is removably secured to body 5 by screws 135, with face 131 and shoulder 134 respectively engaging face 26 and the front end face of boss 27. A frusto-conical outer surface portion 136 of body 106 tapers forwardly and outwardly over approximately one-half the length of the body and is disposed to constitute a forward extension of the outer conical surface of torpedo portion 24 of body 5. Surface portion 136 curves smoothly into a right cylindrical front surface portion 138. The front end face of body 106 inculdes flat transverse annular outer and inner portions 106a and 106b, respectively, which are joined by an intermediate axially extending right cylindrical portion 106c.

The fixed ring 107 has a flat transverse annular rear face 139 and a right cylindrical outer surface 140, the length of ring 107 being equal to the axial space between surface 26 and shoulder 25b so that, in the assembled die, with faces 26 and 139 in engagement, shoulder 25b and the front end face 148 of ring 107 lie in a common plane. Ring 107 is removably secured to body 5 by screws 147. The central bore or ring 107 is defined by a rear frusto-conical surface portion 144, an intermediate frusto-conical surface portion 144a, and a right cylindrical front surface portion 145. Surface portion 144 surrounds the rear portion of surface 136. Surface portion 144a surrounds the remainder of surface 136 and the rear portion of surface 138. The relatively short surface portion 145 surrounds a corresponding portion of surface 138. Surface portions 144, 144a and 145 are concentric with the corresponding surface portions of body 106 and spaced outwardly therefrom so as to define an annular passage constituting a continuation of the passage defined by the outer surface of torpedo portion 24 and the inner surface 22 of the main portion of body 5.

Surface portion 144 tapers forwardly and outwardly at the same angle as surface 22 and, in the assembled die, constitutes a continuation of that surface. Surface 144a also tapers forwardly and outwardly, but at a smaller angle than does surface portion 144. Surface 22 and the conical surface of torpedo portion 24 converge forwardly, as do the corresponding surfaces of ring 107 and body 106, so that the radial width of the resulting passage decreases as the diameter thereof increases, and each axial increment of the passage thus accommodates substantially the same amount of the plastic material being conducted through the passage.

Floating ring 108 has a flat transverse annular rear face 149, a right cylindrical inner surface 150 of the same diameter as surface portion 145 of ring 107, and cylindrical outer surface portions 151 and 152, front portion 152 being of smaller diameter and the two portions being joined by a transverse annular forwardly facing flat shoulder 153. The radial distance between surface 150 and surface portion 151 is such that, when ring 108 is in place, its rear surface 149 lies in face-to-face contact with end face 148 and shoulder 25b. Ring 108 is removably secured to body 5 by radial screws 154 and ring 109, and adjustment of screws 154 is effective to assure precise concentricity between surfaces 138 and 150.

Ring 109 is of rectangular transverse cross section, the diameter of the outer cylindrical surface thereof equalling the outer diameter of portion 25 of body 5, and the inner diameter being slightly larger than the diameter of surface portion 152 of ring 108. Ring 109 is removably secured to portion 25 of body 5 by screws 155 in such fashion that the rear face of ring 109 is in flush engagement with both shoulder 153 and the end face of portion 25. Thus, ring 109 serves to clamp ring 108 against axial movement relative to the remainder of the die structure.

Mandrel 110 comprises an elongated body portion 156, threaded for engagement with threaded bore 28 of boss 27, and a transversely enlarged nose portion 157. The diameter of body portion 156 is such that the mandrel is movable axially relative to surrounding surface 133 of body 106. Nose portion 157 has an outer rearwardly projecting cylindrical skirt 158 of an inner diameter such that the skirt slidably embraces surface portion 138 of body 6. The outer surface of nose portion 157 includes an intermediate right cylindrical portion 159 of a diameter larger than that of surface portion 138 but smaller than that of inner surface 150 of ring 108. At its rear end, skirt 158 has a rearwardly and inwardly tapering frusto-conical outer surface portion 160 so disposed that the skirt terminates in a substantially knife edge 161, at surface 138 of body 106 in the assembled die. The outer surface of the nose portion of the mandrel is completed by an outwardly and forwardly tapering frusto-conical surface portion 163, and a short cylindrical portion 164. In the area between body portion 156 and skirt 158, nose portion 157 has concentric, axially spaced outer and inner flat annular rear faces 157a and 157b, respectively, which are joined by an axially extending cylindrical surface 157c of substantially the same axial length as surface 106c of body 106 and of such diameter as to be slidably embraced by surface 106c. The mandrel has a flat front face 162 provided with sockets 166 to cooperate with a suitable tool by which the mandrel can be turned for axial adjustment when it is desired to change the die gap defined by surface 163 and the juncture between surfaces 150 and 165 of ring 108.

Central axial bore 167 of mandrel 110 accommodates an elongated screw 168 having an axial through passage 169 and an enlarged head 170. The threaded tip of this screw cooperates with the threaded bore 129 in body 5. With the mandrel and screw in place as shown in FIG. 3, passage 169 communicates with bore 29 and thus with duct 30 for the supply of air forwardly through the mandrel to inflate the tubular plastic product extruded by the die.

When used herein, the term "sheet" is intended to include film of a thickness less than 0.010 in. as well as thicker sheet material of a thickness above 0.010 in.

Though the invention has been illustrated as embodied in a die having a forwardly opening orifice, it will be understood that the invention is also applicable to dies having a peripheral, outwardly opening orifice, such a die being disclosed, for example, in my copending application Ser. No. 582,946, filed Sept. 29, 1966, now abandoned. Attention is called to my copending application Ser. No. 623,619, directed to the structure disclosed herein for allowing quick change of the diameter of the die orifice.

What is claimed is:

1. In an extrusion die for producing sheet from thermoplastic polymeric material, the combination of
means defining an annular die orifice;
hollow outer body means;
inner body means disposed within said outer body means;
    said inner body means comprising a forwardly and outwardly tapering at least generally conical portion, and said outer body means having a forwardly and outwardly tapering frusto-conical inner surface portion spaced outwardly from and concentric with said conical portion, the outer surface of said conical portion and said frusto-conical inner surface portion coacting to define a forwardly and outwardly tapering tubular passage portion leading toward said die orifice;
a plurality of angularly spaced spider arms each extending across said passage portion and having its ends rigidly connected respectively to said outer body means and said inner body means, whereby said inner body means is rigidly supported on said outer body means by said spider arms,
    the combination of each of said spider arms and the portion of said outer body means to which the same is connected being provided with a straight bore which opens outwardly through said outer body means and extends inwardly through the spider arms and into said conical portion of said inner body means;
primary heating means carried by said outer body means; and
a plurality of electrical resistance heating cartridges each disposed in a different one of said straight bores and each constituting a secondary heating device operative to heat the corresponding one of said spider arms and the adjacent portion of said conical portion of said inner body means,
    said cartridges each substantially filling the portion of the one of said straight bores in which the respective cartridge is disposed.

2. In an extrusion die for producing sheet from thermoplastic polymeric material, the combination of
means defining an annular die orifice;
hollow outer body means;
inner body means disposed within said outer body means,
    said outer and inner body means being spaced apart concentrically and cooperating to define a tubular passage leading to said orifice,
    said outer body means defining a cylindrical passage portion located upstream from said inner body means,
said inner body means comprising a forwardly and outwardly tapering at least substantially conical portion having its tip located at said cylindrical passage portion, said cylindrical passage portion and said conical portion of said inner body means being coaxial,
said outer body means having a forwardly and outwardly tapering frusto-conical inner surface portion commencing at said cylindrical passage portion and surrounding and spaced outwardly from said conical portion of said inner body means, the diameter of the smaller end of said frusto-conical inner surface portion being equal to the diameter of said cylindrical passage portion,
said frusto-conical inner surface portion of said outer body means and the outer surface of said conical portion of said inner body means being concentric and converging forwardly, the transverse cross-sectional area of the tubular passage portion defined by said surfaces being at least substantially constant throughout the length of said frusto-conical inner surface portion;
a plurality of angularly spaced spider arms each extending between said conical portion of said inner body means and the surrounding portion of said outer body means and thus being located within the tubular passage portion defined by said frusto-conical inner surface portion and the outer surface of said conical portion of said inner body means,
    each of said spider arms having its ends rigidly connected respectively to said outer body means and said inner body means, whereby said inner body means is supported on said outer body means by said spider arms, the combination of each of said spider arms and the portion of said outer body means to which the same is connected being provided with a straight bore which opens outwardly through said outer body means and extends inwardly through the spider arm;

primary heating means carried by said outer body means; and a plurality of secondary heating devices each disposed in one of said straight bores to heat the corresponding one of said spider arms.

3. The combination according to claim 2, wherein the die comprises two of said spider arms and said two spider arms are aligned with each other diametrically across said passage, and said straight bores of said two arms constitute portions of a single continuous straight bore extending transversely through the die.

References Cited

UNITED STATES PATENTS

| | | |
|---|---|---|
| 1,925,545 | 9/1933 | Royle. |
| 1,956,330 | 4/1934 | Mullin. |
| 2,821,745 | 2/1958 | Patton. |
| 3,305,893 | 2/1967 | Machen. |
| 3,311,952 | 4/1967 | Kovach et al. |
| 3,345,690 | 10/1967 | Hagen. |
| 3,357,050 | 12/1967 | Criss. |

WILLIAM J. STEPHENSON, Primary Examiner